(12) United States Patent
Xiang

(10) Patent No.: US 10,691,424 B2
(45) Date of Patent: Jun. 23, 2020

(54) METHOD FOR PROGRAMMING AND TERMINAL DEVICE

(71) Applicant: FIBERSTORE CO., LIMITED, Shenzhen, Guangdong (CN)

(72) Inventor: Wei Xiang, Shenzhen (CN)

(73) Assignee: FIBERSTORE CO., LIMITED, Shenzhen (CN)

( * ) Notice: Subject to any disclaimer, the term of this patent is extended or adjusted under 35 U.S.C. 154(b) by 0 days.

(21) Appl. No.: 16/166,236

(22) Filed: Oct. 22, 2018

(65) Prior Publication Data

US 2020/0050433 A1 Feb. 13, 2020

(30) Foreign Application Priority Data

Aug. 8, 2018 (CN) .......................... 2018 1 0895171

(51) Int. Cl.
 *G06F 8/34* (2018.01)
 *G06F 21/62* (2013.01)
 *G06F 21/60* (2013.01)

(52) U.S. Cl.
 CPC .............. *G06F 8/34* (2013.01); *G06F 21/602* (2013.01); *G06F 21/6218* (2013.01)

(58) Field of Classification Search
 CPC ....... G06F 8/34; G06F 21/602; G06F 21/6218
 See application file for complete search history.

(56) References Cited

U.S. PATENT DOCUMENTS

| 5,799,319 | A | * | 8/1998 | Atkins | .................... G06F 16/58 382/305 |
| 6,145,022 | A | * | 11/2000 | Takizawa | ............... B29O 45/76 700/200 |
| 6,263,387 | B1 | * | 7/2001 | Chrabaszcz | ......... G06F 13/4086 709/220 |
| 6,735,691 | B1 | * | 5/2004 | Capps | ................. G06F 9/44505 713/1 |
| 6,924,826 | B1 | * | 8/2005 | Nakagiri | ............... G06F 3/1204 358/1.15 |
| 7,526,516 | B1 | * | 4/2009 | Pavlyushchik | ....... G06F 21/554 |

(Continued)

OTHER PUBLICATIONS

European Search Report filed in EP 18201844 dated Apr. 18, 2019.

*Primary Examiner* — Adam Lee
(74) *Attorney, Agent, or Firm* — Davis Wright Tremaine LLP

(57) ABSTRACT

A method and a terminal device for programming are provided. The method for programming includes: loading a programming driver; receiving programming instructions including programming file identification information sent by a user; sending a target programming file to a program editor via the programming driver when the target programming file is obtained from the programming file database based on the programming file identification information; receiving a customized information from the user when the target programming file is not obtained by the server from the programming file database according to the programming file identification information, and receiving a customized programming file based on the customized information, and sending the customized programming file to the program editor via the programming driver; executing a programming operation for a device based on the target programming file.

13 Claims, 4 Drawing Sheets

(56) References Cited

U.S. PATENT DOCUMENTS

| | | | | |
|---|---|---|---|---|
| 7,991,747 B1* | 8/2011 | Upadhyay | G06F 11/004 | 707/674 |
| 8,880,694 B2* | 11/2014 | Kamei | H04L 67/06 | 709/225 |
| 10,025,467 B1* | 7/2018 | Bunyan | G06F 3/0484 | |
| 2002/0178436 A1* | 11/2002 | Mastrianni | G06F 16/10 | 717/110 |
| 2003/0078918 A1* | 4/2003 | Souvignier | G06F 16/10 | |
| 2003/0177144 A1* | 9/2003 | Hover | G06F 8/654 | |
| 2004/0019896 A1* | 1/2004 | Yu | G06F 9/4411 | 719/321 |
| 2005/0039193 A1* | 2/2005 | Choi | G06F 3/04847 | 719/321 |
| 2005/0094173 A1* | 5/2005 | Engelman | G06F 3/1204 | 358/1.11 |
| 2006/0152760 A1* | 7/2006 | Hong | G06F 3/1204 | 358/1.15 |
| 2006/0236375 A1* | 10/2006 | Hammadou | H04N 7/181 | 726/3 |
| 2007/0244921 A1* | 10/2007 | Blair | G06Q 10/101 | |
| 2007/0244987 A1* | 10/2007 | Pedersen | H04L 67/06 | 709/217 |
| 2008/0034421 A1* | 2/2008 | Ahn | G06F 21/10 | 726/17 |
| 2009/0094228 A1* | 4/2009 | Bondurant | G11B 19/02 | |
| 2010/0058360 A1* | 3/2010 | Asai | G06F 9/4411 | 719/321 |
| 2010/0250585 A1* | 9/2010 | Hagg | G06F 16/70 | 707/769 |
| 2011/0119479 A1* | 5/2011 | Cowie | G06Q 10/06 | 713/100 |
| 2011/0238626 A1* | 9/2011 | Hao | G06F 11/1458 | 707/644 |
| 2012/0137365 A1* | 5/2012 | Lee | G06F 21/564 | 726/23 |
| 2013/0007289 A1* | 1/2013 | Seo | G06F 8/654 | 709/227 |
| 2013/0054843 A1* | 2/2013 | Jan | G06F 3/1454 | 710/16 |
| 2014/0236527 A1 | 8/2014 | Chan | | |
| 2015/0378656 A1* | 12/2015 | Kessler | G06F 3/1222 | 358/1.13 |
| 2016/0274851 A1* | 9/2016 | Minegishi | G06F 3/1225 | |
| 2017/0039245 A1* | 2/2017 | Wholey, III | G06F 16/9024 | |
| 2018/0322037 A1* | 11/2018 | Thazhathekalam | G06F 11/3688 | |

\* cited by examiner

METHOD FOR PROGRAMMING AND TERMINAL DEVICE

TECHNICAL FIELD

The present disclosure pertains to the field of communication, and particularly relates to a method for programming and terminal device.

BACKGROUND

With the expansion of data in the data age, and the rise of devices such as various brand of switches etc., as well as the demand of customer customization, the optical modules compatible and adaptable to various brand of switch devices have become a prospective development trend. Through programming and/or programming modification by a program editor, the optical module may be compatible and adaptable to various brands of switch devices. At present, it is necessary to install a variety of complicated programs, and it requires a professional to complete when programming and/or modifying programs for the optical module, which brings great inconvenience to the user.

SUMMARY

Given this, the present invention provides a method for programming and a terminal device, to solve the problem that the programming and/or programming modification operation in the prior art needs to install a variety of complicated programs and is completed through a professional, and hence bringing great inconvenience to the user.

The first aspect of embodiments of the present application provides a method for programming, comprising:

loading a programming driver;

receiving programming instructions sent by a user, and the programming instructions include programming file identification information;

sending the target programming file to the program editor via the programming driver if the target programming file is obtained from the programming file database based on the programming file identification information, such that the program editor executes programming operation for the device based on the target programming file.

In a first implementation of the first aspect of embodiments of the present invention, the method further comprises:

loading an interface for editing programming instructions when the server receives information, detected by the programming driver, that the program editor is successfully connected to the terminal and the device is successfully connected to the program editor;

the step of receiving programming instructions sent by a user comprises:

receiving the programming instructions input in the interface for editing programming instructions by the user.

With reference to the first implementation of the first aspect, in a second implementation, receiving a reset instruction sent by the user;

resetting the interface for editing programming instructions according to the reset instruction.

In a third implementation of the first aspect, the step of receiving programming instructions sent by a user comprises:

receiving an information of the device sent by the programming driver;

loading a list for selecting a programming file according to the information of the device;

receiving the programming instructions sent by the user according to the list for selecting the programming file.

In a fourth implementation of the first aspect, the target programming file is an encrypted programming file;

the step of sending the target programming file to the program editor via the programming driver comprises:

sending the target programming file to the programming driver, such that the programming driver decrypts the target programming file and sends the decrypted target programming file to the program editor.

In a fifth implementation of the first aspect, the method further comprises:

obtaining programming status information, and sending the programming status information to the user.

With reference to any implementation in the first aspect to the fifth implementation of the first aspect, in a seventh implementation, the method further comprises:

receiving a customized information sent by the user if the target programming file is not obtained from the programming file database according to the programming file identification information;

receiving a customized programming file sent by an administrator based on the customized information;

receiving application instructions sent by the user, and sending the customized programming file to the program editor via the programming driver based on the application instructions, such that the program editor executes programming operation for the device based on the customized programming file.

With reference to the seventh implementation of the first aspect, in an eighth implementation, before receiving the customized information sent by the user, the method further comprises:

receiving an authorization request instruction sent by the user, the authorization request instruction is used for requesting an authorization of the customized programming file;

sending the authorization request instruction to the administrator;

granting the user authorization corresponding to the authorization request instruction according to an approval instruction, if receiving the approval instruction sent by the administrator.

The second aspect of embodiments of the present application provides a method for programming, comprising:

receiving a target programming file sent by a programming driver, the target programming file are programming instructions received by a server and sent by a user, and the programming instructions include programming file identification information and obtained from a programming file database based on the programming file identification information;

executing programming operation for a device according to the target programming file.

In a first implementation of the second aspect, the method further comprises:

receiving a customized programming file sent by the programming driver, the customized programming file is obtained through the server receiving a customized information sent by the user, and receiving the customized programming file sent by the administrator based on the customized information;

executing programming operation for the device according to the customized programming file.

A third aspect of embodiments of the present invention provides a terminal device comprising a memory, a processor and computer programs stored in the memory and able to be executed in the processor, wherein, the processor implements the steps of the method in the first aspect of embodiments of the present invention when executing the computer programs, or the processor implements the steps of the method in the second aspect of embodiments of the present invention when executing the computer programs.

Compared with the prior art, the beneficial effects of the embodiments of the present invention lie in that: the embodiments of the present invention obtain the target programming file from the programming file database according to the programming instructions sent by the user, and sends the target programming file to the program editor via the programming driver, the program editor executes programming operation for the device based on the target programming file. The user can implement programming operation as long as inputting programming instructions and it is unnecessary for the user to acquire professional skills, which is easy and convenient to operate, and saves cost.

BRIEF DESCRIPTION OF THE DRAWINGS

In order to illustrate the technical solutions in embodiments of the present invention more clearly, the drawings needed in the description of the embodiments or the prior art will be introduced briefly below. Obviously, the drawings described below are merely some embodiments of the present invention, and other drawings may be obtained for those skilled in the art without creative labor according to these drawings.

ILLUSTRATIVE EMBODIMENTS

In the following description, specific details such as specific system structures and technologies or the like are provided for illustration, and it is not intended to limit, such that to understand embodiments of the present invention thoroughly. However, those skilled in the art should understand that the present invention may also be implemented in embodiments without these specific details. In other cases, detailed description for well-known systems, devices, circuits and methods is omitted, to avoid unnecessary details interfering with the description of the invention.

It should be understood that, when used in the description and the appended claims, the term "comprise" refers to the existence of the feature, entirety, step, operation, element and/or component described, but does not exclude the existence or adding of one or more other feature, entirety, step, operation, element, component and/or device set.

It should also be understood that, the terms used in the present description are merely aimed at describing specific embodiment and not intended to limit the present application. As used in the description and the appended claims of the present application, the singular forms "a", "one" and "said" means comprising plural forms, unless other situations are indicated clearly in the context.

It should also be further understood that, the term "and/or", used in the description and the appended claims of the present application, refers to one or more arbitrary combination and all possible combinations of the items listed as relevant, and comprises these combinations.

As used in the description and the appended claims, the term "if" may be interpreted as "when", "once", "in response to determining" or "in response to" detecting according to the context. Similarly, the phrase "if determining" or "if detecting (the described condition or event)" may be interpreted as "once determining", "in response to determining", "once detecting (the described condition or event)" or "in response to detecting (the described condition or event)" according to the context.

In order to illustrate the technical solutions of the present invention, the following is illustrated by specific embodiments.

Figure 1:
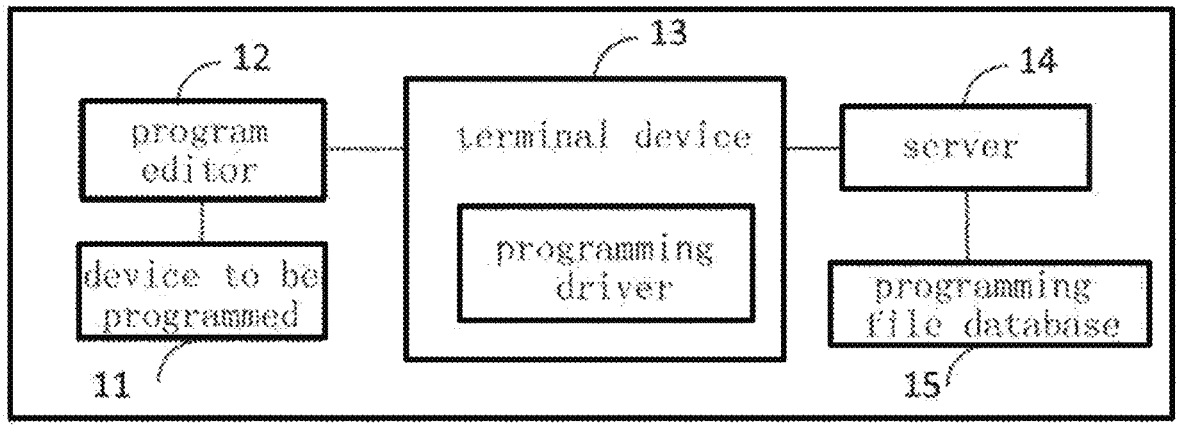
FIG. 1 is a schematic diagram of an application environment of the method for programming provided by one embodiment of the present invention.

Please refer to FIG. 1, which is a schematic diagram of an application environment of the method for programming provided by one embodiment of the present invention. Said application environment comprises a device 11, a program editor 12, a terminal device 13, a server 14 and a programming file database 15, wherein, the terminal device 13 installed with a programming driver. The device 11 is an optical module or other devices that require programming and/or programming modification. The program editor 12 is provided with a variety of sockets, which may be inserted into different types of devices to be programmed, and the program editor 12 executes programming operation for the device 11 which is inserted therein. The program editor 12 is arranged with an indicator light for indicating coding status, for example, that the green light is on indicates that the device is connected, that the red light is on indicates failure to program. The program editor 12 is connected with the terminal device 13. The terminal device 13, an electronic device mainly used for sending user information and outputting processing results, is at outermost periphery of a computer network, and the terminal device 13 may be a computer, a tablet computer, a telephone, a personal digital assistant, a wearable electronic device or the like. For example, the program editor 12 is connected with the computer through an USB (Universal Serial Bus, USB). The server 14, used for responding to serve requests and providing a device computing services meanwhile, for example, may be one or more computer, or a cloud server. The server 14 is connected with the terminal device 13. The programming file database 15 is stored with a variety of programming files, the programming file database 15 may be stored in a memory, and the memory is connected to the server 14, otherwise the programming file database 15 is arranged in the server 14, which is not limited by embodiments of the present invention.

The user sends a login request through the terminal device 13, and the login request includes a login account and a password. The server 14 verifies the login account and the password, and the terminal device 13 sets up connection with the server 14 after the verification is passed. After the server 14 has set up connection with the terminal device 13, the server 14 detects whether the terminal device 13 is installed with a program editor driver corresponding with the program editor 12, and the server 14 automatically installs the programming driver in the terminal device 13 when it is detected that the terminal device 13 is not installed with the programming driver, or the server 14 receives an installation instruction sent by the user and installs the programming driver in the terminal device 13 according to the installation instruction, then loads the programming driver after finishing installation. The server 14 loads the programming driver directly once detects there is a programming driver installed in the terminal device 13.

The programming driver sequentially detects whether the program editor 12 and the device 11 are connected with the terminal device 13. After the program editor 12 and the device 11 are connected with the terminal device 13, the user sends programming instructions through the terminal device 13, and the programming instructions are sent to the server 14, the programming instructions include programming file identification information. After receiving the programming instructions, the server 14 obtains and stores a target programming file from the programming file database 15 based on the programming file identification information, and sends the target programming file to the program editor 12 via the programming driver, the program editor 12 executes programming operation for the device 11 based on the target programming file.

Figure 2:
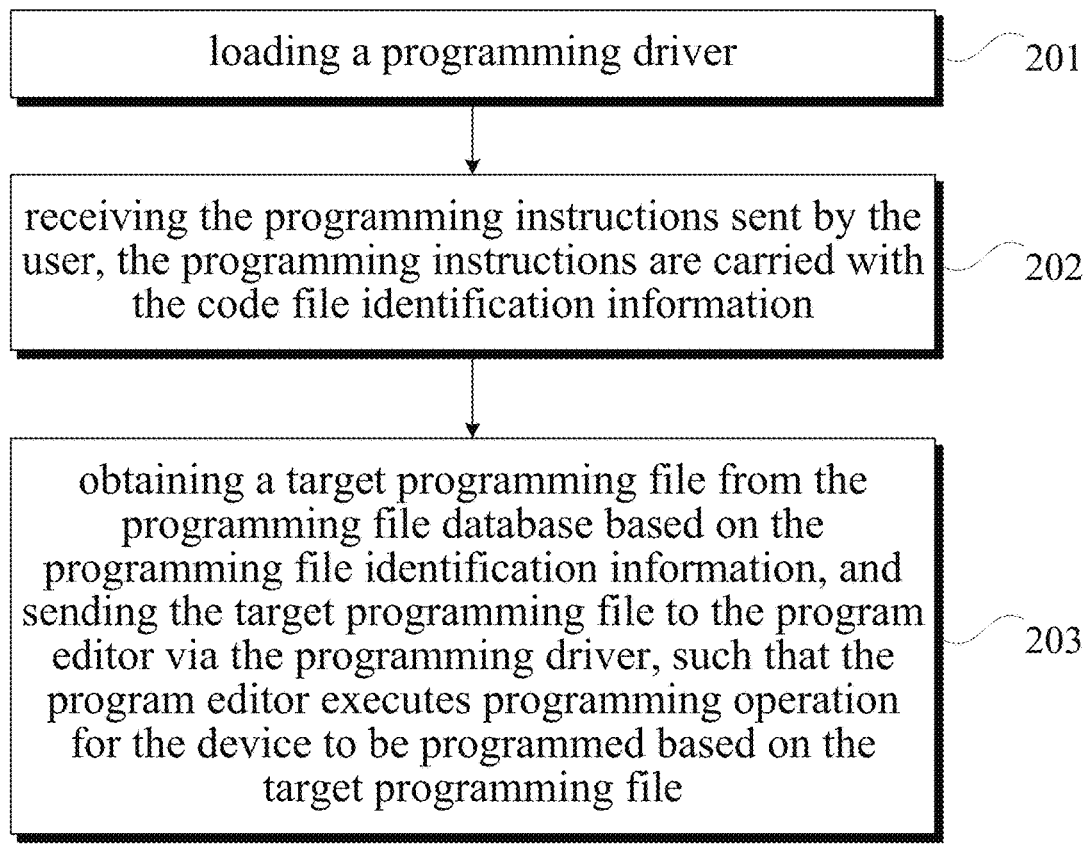
FIG. 2 is a flow diagram of implementing the method for programming provided by another embodiment of the present invention.

Please refer to FIG. 2, FIG. 2 is a flow diagram of implementing the method for programming provided by one embodiment of the present invention, the method is applied to the server, and the method comprises the following steps of:

Step S201, loading a programming driver.

In embodiments of the present invention, the programming driver matches with the program editor, and the programming driver serves for a window for data transmission between the program editor and the server. When it is detected that there is a new version of the programming driver in the server for downloading the programming driver, an updating operation for the programming driver is performed, and the updated programming driver is loaded.

Step S202, receiving the programming instructions sent by the user, the programming instructions include the programming file identification information.

In embodiments of the present invention, the user sends the programming instructions through the terminal device, and the programming instructions are sent to the server. Therein, the programming instructions include the programming file identification information, and the programming file identification information comprises but not limits to a name and an identification number of the programming files.

As one embodiment of the present invention, the programming driver sequentially detects whether the programming plate and the device are successfully connected, and sends successful connection information of the programming plate to the server once it is detected that the programming plate is connected successfully. After detecting that the device is connected successfully, the programming driver sends information to the server that the device is successfully connected; after receiving the information that the program editor is successfully connected and the information that the device is successfully connected, the server loads an interface for editing programming instructions, and the user inputs the programming instructions through the interface for editing programming instructions. In one implementation, the server receives information of the device sent by the programming driver, and displays it on a display screen of the terminal device, the user inputs the programming instructions according to the information of the device. For example, the information of the device comprises information such as product models, serial numbers, wavelengths and compatible brands or the like, the user sends the programming instructions with reference to the information of the device, and programs for the device.

As another embodiment of the present invention, the server receives the information of the device sent by the programming driver, loads a list for selecting the programming file based on the information of the device, and receives the programming instructions input by the user according to the list for selecting the programming file. The information of the device comprises information such as product models, serial numbers and compatible brands or the like, the list for selecting the programming file comprises, but is not limited to a file list of the product models, a file list of the serial numbers and a file list of the compatible brands programs, the user inputs the identification information of the necessary programming file according to the list for selecting the programming file.

As another embodiment of the present invention, the method for programming may further comprise: receiving a reset instruction sent by the user; resetting the interface for editing programming instructions according to the reset instruction.

In embodiment of the present invention, the server resets the interface for editing programming instructions according to the reset instruction, such that the user executes programming operation for a new device, or modifies the programming instructions.

Step S203, obtaining a target programming file from the programming file database based on the programming file identification information, and sending the target programming file to the program editor via the programming driver, such that the program editor executes programming operation for the device based on the target programming file.

In embodiment of the present invention, after receiving the programming instructions, the server determines whether there is a target programming file in the programming file database based on the programming file identification information carried in the programming instructions, if there is, then obtains the target programming file, and sends the target programming file to the program editor via the programming driver, the program editor executes programming operation for the device based on the target programming file.

The embodiment of the present invention obtains the target programming file from the programming file database according to the programming instructions sent by the user, and sends the target programming file to the program editor via the programming driver, the program editor executes programming operation for the device based on the target programming file. The user can implement programming operation at any time and no professionals are required, which operates easily and conveniently, and saves cost.

As one embodiment of the present invention, the programming files stored in the programming file database are encrypted programming files, similarly, the target programming file is an encrypted programming file. After receiving the target programming file, the server sends the target programming file to the programming driver, the programming driver decrypts the target programming file and sends the decrypted target programming file to the program editor, and the program editor executes programming operation for the device according to the decrypted target programming file. Through encrypting the target programming file, it is able to prevent the target programming file from being stolen.

As one embodiment of the present invention, the method for programming further comprises: obtaining programming status information, and sending the programming status information to the user. The embodiment of the present invention enables the user to be aware of the programming status in time. The programming status comprises, but is not limited to a connection status of the programming plate, a connection status of the device, a programming status and a programming completion status.

Figure 3:
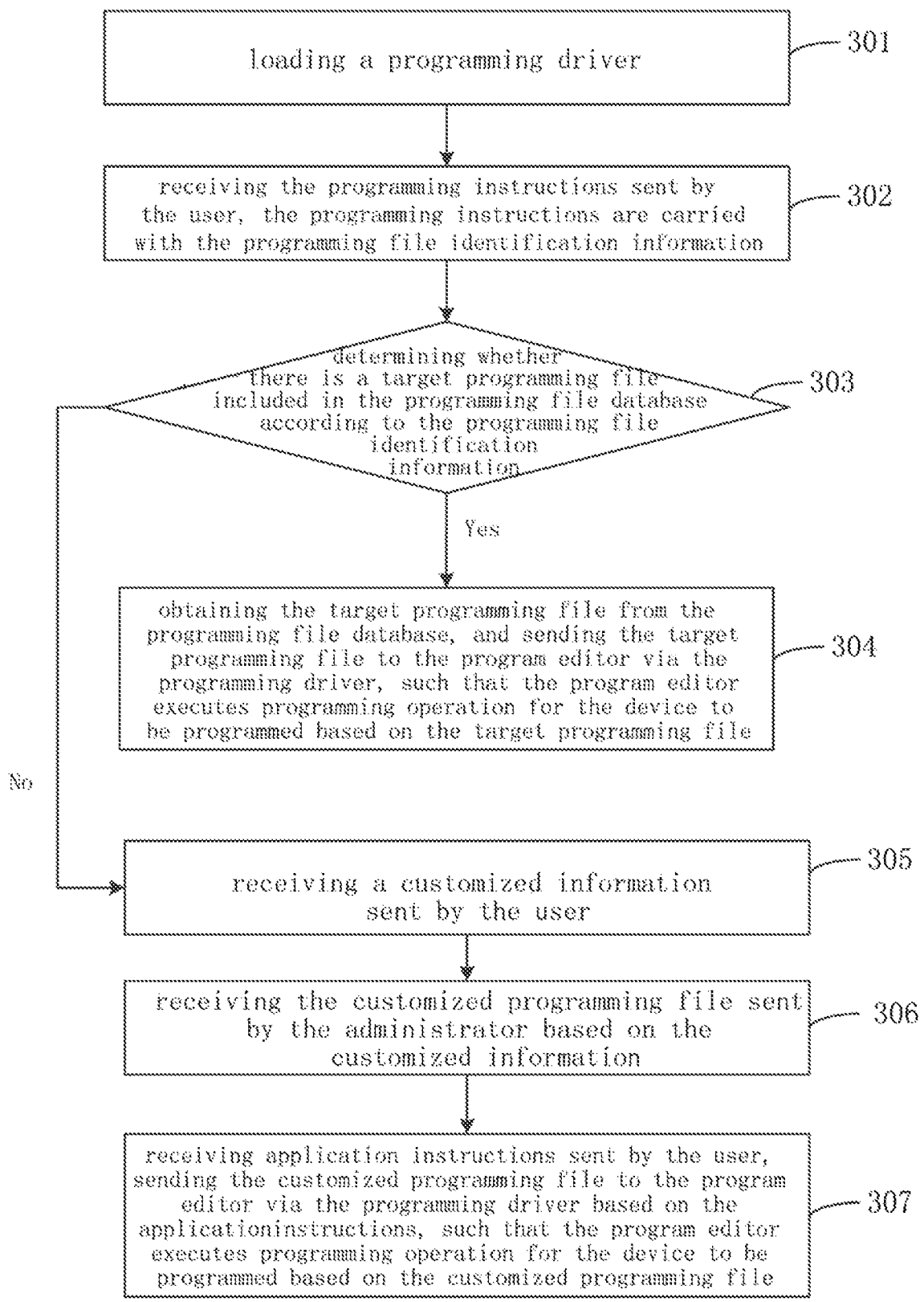
FIG. 3 is a flow diagram of implementing the method for programming provided by another embodiment of the present invention.

Please refer to FIG. 3, FIG. 3 is a flow diagram of implementing the method for programming provided by an embodiment of the present invention, the method comprises:

Step S301, loading a programming driver.

Step S302, receiving the programming instructions sent by the user, the programming instructions include the programming file identification information.

In the embodiment of the present invention, the implementations of step S301 to step S302 are the same with the implementations of step S201 to step S202, which are not described in the embodiment of the present invention.

Step S303, determining whether there is a target programming file included in the programming file database according to the programming file identification information, if there is, executing step S304, otherwise executing step S305 to step S307.

In the embodiment of the present invention, the server obtains a first identification information of the programming files stored in the programming file database, and matches the programming file identification information carried in the programming instructions with the first identification information, if matching successfully which indicates that there is the target programming file stored in the programming file database, then obtains the target programming file corresponding to the programming file identification information, if matching unsuccessfully which indicates there is not the target programming file stored in the programming file database, then executes step S305 to step S307.

Step S304, obtaining the target programming file from the programming file database, and sending the target programming file to the program editor via the programming driver, such that the program editor executes programming operation for the device based on the target programming file.

In the embodiment of the present invention, the server obtains the target programming file from the programming file database, and sends the target programming file to the program editor via the programming driver, the program editor executes programming operation for the device based on the target programming file.

Step S305, receiving a customized information sent by the user.

In the embodiment of the present invention, when the programming file database is not stored with a programming file required by the user, the user is required to customize the programming file. The customized information comprises, but is not limited to information of the device and programming information, the programming information may be information such as product models, serial numbers and compatible brands or the like after programming.

As one embodiment of the present invention, before step S305, the method further comprises: receiving an authorization request instruction sent by the user, the authorization request instruction is used for requesting an authorization to the customized programming file; sending the authorization request instruction to an administrator; if receiving an approval instruction sent by the administrator, then granting the user authorization corresponding to the authorization request instruction according to the approval instruction.

In the embodiment of the present invention, the user sends the authorization request instruction to the server through the terminal device, the authorization request instruction is used for requesting an authorization to the customized programming file, and the authorization request instruction comprises but is not limited to an applicant, an application time, a user contact and an application reason. After receiving the authorization request instruction, the server sends the authorization request instruction to the terminal device the administrator logging in, and the authorization request instruction is approved by the administrator. If the server receives the approval instruction sent by the administrator, then the user is granted the authorization corresponding to the authorization request instruction applied, i.e. the user is granted the authorization to the customized programming file. The embodiment of the present invention obtains access to the customized programming file through the user authorization request instruction, which is convenient for the administrator to select and administrate the users of the customized programming files, so that to prevent maliciously customizing programming files.

Step S306, receiving the customized programming file sent by the administrator based on the customized information.

In the embodiment of the present invention, the administrator customizes the programming file based on the customized information, or the administrator sends the customized information to a relevant professional, and the professional customizes the programming file based on the customized information. The administrator sends the customized programming file to the server through the terminal device he logging in.

Step S307, receiving application instructions sent by the user, sending the customized programming file to the program editor via the programming driver based on the application instructions, such that the program editor executes programming operation for the device based on the customized programming file.

In the embodiment of the present invention, the server receives the customized programming file sent by the administrator, and sends customization success information to the user terminal device. After receiving the application instructions sent by the user, the server sends the customized programming file to the program editor via the programming driver, and the program editor executes programming operation for the device based on the customized programming file. The embodiment of the present invention may meet various demands of the user, and it is not necessary to send the device back the manufacturer to program, which saves time and cost.

The embodiment of the present invent ion obtains the target programming file according to the programming instructions sent by the user, and sends the target programming file to the program editor via the programming driver, the program editor executes programming operation for the device based on the target programming file. The user can implement programming operation at any time and no professionals are required, which operates easily and conveniently, and saves cost.

Figure 4:
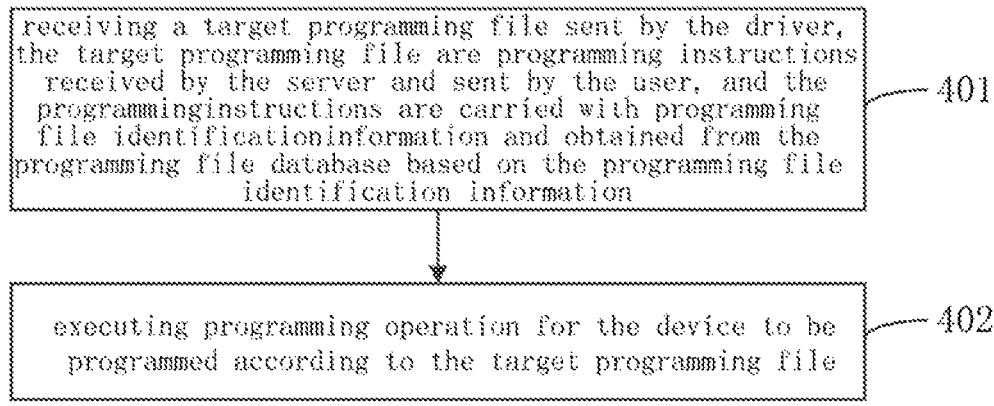
FIG. 4 is a flow diagram of implementing the method for programming provided by another embodiment of the present invention.

FIG. 4 is a flow diagram of implementing the method for programming provided by one embodiment of the present invention, the method is applied to the program editor, and the method comprises the following steps of:

Step S401, receiving a target programming file sent by the programming driver, the target programming file are programming instructions received by the server and sent by the user, and the programming instructions include programming file identification information and obtained from the programming file database based on the programming file identification information.

In the embodiment of the present invention, that the program editor receives the target programming file and the access to the target programming file are the same with the implementations of step S201 to step S203, which are not described in the embodiment of the present invention.

Step S402, executing programming operation for the device according to the target programming file.

In the embodiment of the present invention, the program editor executes programming operation for the device based on the target programming file.

The embodiment of the present invention obtains the target programming file from the programming file database according to the programming instructions sent by the user, and sends the target programming file to the program editor via the programming driver, the program editor executes programming operation for the device based on the target programming file. The user can implement programming operation at any time and no professionals are required, which operates easily and conveniently, and saves cost.

As one embodiment of the present invention, the method for programming further comprises: receiving a customized programming file sent by the programming driver, the customized programming file is obtained through the server receiving a customized information sent by the user and receiving the customized programming file sent by the administrator based on the customized information; executing programming operation for the device according to the customized programming file.

In the embodiment of the present invention, the program editor receives the customized programming file sent by the programming driver, and executes programming operation for the device based on the customized programming file. The customized programming file is obtained by the server, and the access to the customized programming file is the same with the access to the customized programming file in step S305 to step S307 in the embodiment of the present invention, which is not described in the embodiment of the present invention.

It should be understood that, the sequence numbers of the steps in the above embodiments do not means the order of execution, and the execution order of the processes should be determined by its function and internal logic, which should not be construed as limiting the implementation of the embodiments of the present invention.

Figure 5:
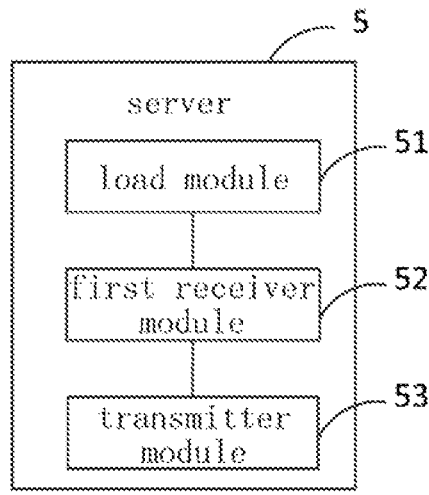
FIG. 5 is a schematic diagram of a server provided by one embodiment of the present invention.

Please refer to FIG. 5, FIG. 5 is a schematic view of a server provided by an embodiment of the present invention, and the server 5 comprises a load module 51, a first receiver module 52 and a transmitter module 53, the specific functions of each of the modules are as follows:

the load module 51 is used for loading a programming driver;

the first receiver module 52 is used for receiving the programming instructions sent by the user, the programming instructions include the programming file identification information;

the transmitter module 53 is used for obtaining a target programming file from the programming file database based on the programming file identification information, and sending the target programming file to the program editor via the programming driver, such that the program editor executes programming operation for the device based on the target programming file.

As one embodiment of the present invention, the load module 51 is further used for loading an interface for editing programming instructions when the server receives information, detected by the programming driver, that the program editor is successfully connected to the terminal and the device is successfully connected to the program editor.

The first receiver module 52 is used for receiving the programming instructions input in the interface for editing programming instructions by the user.

As one embodiment of the present invention, the first receiver module 52 is further used for receiving a reset instruction sent by the user; resetting the interface for editing programming instructions according to the reset instruction.

As one embodiment of the present invention, the first receiver module 52 is used for receiving the information of the device sent by the programming driver; loading a list for selecting a programming file based on the information of the device; and receiving the programming instructions sent by the user according to the list for selecting the programming file.

As one embodiment of the present invention, the target programming file is an encrypted programming file; the transmitter module 53 is used for sending the target programming file to the programming driver, such that the programming driver decrypts the target programming file and sends the decrypted target programming file to the program editor.

As one embodiment of the present invention, the server further comprises: an acquisition module for obtaining programming status information, and sending the programming status information to the user.

As one embodiment of the present invention, the server further comprises: a customization module for receiving the customized information sent by the user if there is no access to the target programming file from the programming file database based on the programming file identification information, receiving the customized programming file sent by the administrator based on the customization information, receiving the application instructions sent by the user, sending the customized programming file to the program editor via the programming driver according to the application instructions, such that the program editor executes programming operation for the device based on the customized programming file.

As one embodiment of the present invention, the customization module is further used for: receiving an authorization request instruction sent by the user, the authorization request instruction is used for requesting an authorization to the customized programming file; sending the authorization request instruction to an administrator; if receiving an approval instruction sent by the administrator, then granting the user authorization corresponding to the authorization request instruction according to the approval instruction.

The embodiment of the present invention obtains the target programming file from the programming file database according to the programming instructions sent by the user, and sends the target programming file to the program editor via the programming driver, the program editor executes programming operation for the device based on the target programming file. The user can implement programming operation at any time and no professionals are required, which operates easily and conveniently, and saves cost.

Figure 6:
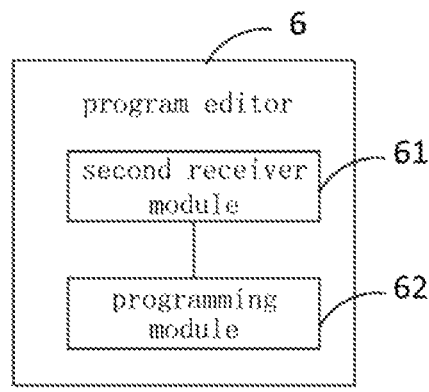
FIG. 6 is a schematic diagram of a program editor provided by one embodiment of the present invention.

Please refer to FIG. 6, FIG. 6 is a schematic view of a program editor provided by an embodiment of the present invention, and the program editor 6 comprises a second receiver module 61 and a programming module 62, the specific functions of each of the modules are as follows:

the second receiver module 61 is used for receiving a target programming file sent by the programming driver, the target programming file are programming instructions received by the server and sent by the user, and the programming instructions include programming file identification information and obtained from the programming file database based on the programming file identification information;

the programming module 62 is used for executing programming operation for the device according to the target programming file.

As one embodiment of the present invention, the second receiver module 61 is further used for receiving a customized programming file sent by the programming driver, the customized programming file is obtained through the server receiving a customized information sent by the user and receiving the customized programming file sent by the administrator based on the customized information;

the programming module 62 is further used for executing programming operation for the device according to the customized programming file.

The embodiment of the present invention obtains the target programming file from the programming file database according to the programming instructions sent by the user, and sends the target programming file to the program editor via the programming driver, the program editor executes programming operation for the device based on the target programming file. The user can implement programming operation at any time and no professionals are required, which operates easily and conveniently, and saves cost.

Figure 7:
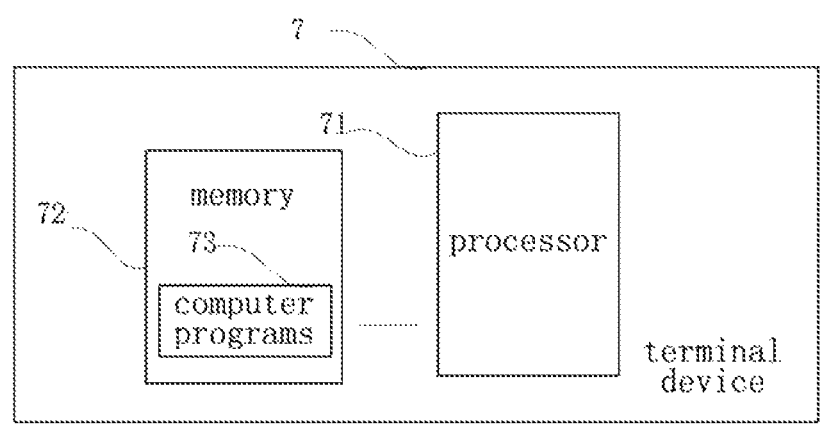
FIG. 7 is a schematic diagram of a terminal device provided by an embodiment of the present invention.

FIG. 7 is a schematic diagram of a terminal device provided by an embodiment of the present invention. As shown in FIG. 7, the terminal device 7 of the present embodiment comprises: a processor 71, a memory 72 and computer programs 73 stored in the memory 72 and able to be executed in the processor 71. When executing the computer programs 73, the processor 71 implements the steps of above various embodiments of the method for programming, such as steps S201-S203 as shown in FIG. 2. Alternatively, when executing the computer programs 73, the processor 71 implements the functions of various modules/ units in above various embodiments of the device, such as the functions of modules 51-53 as shown in FIG. 5.

Exemplary, the computer programs 73 may be divided into one or more module/unit, and the one or more module/ unit is stored in the memory 72 and executed by the processor 71 to implement the present invention. The one or more module/unit may be a series of instruction segments of the computer programs capable of performing a particular function, and the instruction segments are used for describing the executing procedure of the computer programs 73 in the terminal device 7. For example, the computer program 73 may be divided into the load module, the first receiver module and the transmitter module, and the specific functions of the various modules are as follows:

the load module is used for loading a programming driver;

the first receiver module is used for receiving the programming instructions sent by the user, the programming instructions include the programming file identification information.

the transmitter module is used for obtaining a target programming file from the programming file database based on the programming file identification information, and sending the target programming file to the program editor via the programming driver, such that the program editor executes programming operation for the device based on the target programming file.

As one embodiment of the present invention, the load module is further used for loading an interface for editing programming instructions, if receiving information that a program editor is successfully connected and information that a device is successfully connected sent by a programming driver;

The first receiver module is used for receiving the programming instructions input in the interface for editing programming instructions by the user.

As one embodiment of the present invention, the first receiver module is further used for receiving a reset instruction sent by the user; resetting the interface for editing programming instructions according to the reset instruction.

As one embodiment of the present invention, the first receiver module is used for receiving the information of the device sent by the programming driver; loading a list for selecting a programming file based on the information of the device; and receiving the programming instructions sent by the user according to the list for selecting the programming file.

As one embodiment of the present invention, the target programming file is an encrypted programming file; the transmitter module is used for sending the target programming file to the programming driver, such that the programming driver decrypts the target programming file and sends the decrypted target programming file to the program editor.

As one embodiment of the present invention, the computer programs further comprises: an acquisition module for obtaining programming status information, and sending the programming status information to the user.

As one embodiment of the present invention, the server further comprises: a customization module for receiving the customized information sent by the user if there is no access to the target programming file from the programming file database based on the programming file identification information, receiving the customized programming file sent by the administrator based on the customization information, receiving the application instructions sent by the user, sending the customized programming file to the program editor via the programming driver according to the application instructions, such that the program editor executes programming operation for the device based on the customized programming file.

As one embodiment of the present invention, the customization module is further used for: receiving an authorization request instruction sent by the user, the authorization request instruction is used for requesting an authorization to the customized programming file; sending the authorization request instruction to an administrator; if receiving an approval instruction sent by the administrator, then granting the user authorization corresponding to the authorization request instruction according to the approval instruction.

Alternatively, the computer program 73 may be divided into the second receiver module and the programming module, and the specific functions of the various modules are as follows:

the second receiver module is used for receiving a target programming file sent by the programming driver, the target programming file are programming instructions received by the server and sent by the user, and the programming instructions include programming file identification information and obtained from the programming file database based on the programming file identification information;

the programming module is used for executing programming operation for the device according to the target programming file.

As one embodiment of the present invention, the second receiver module is further used for receiving a customized programming file sent by the programming driver, the customized programming file is obtained through the server receiving a customized information sent by the user and receiving the customized programming file sent by the administrator based on the customized information;

the programming module is further used for executing programming operation for the device according to the customized programming file.

The terminal device 7 may be a computing device such as a desktop computer, a notebook, a palmtop computer, and a cloud server. The terminal device may comprise, but is not limited to, the processor 71, the memory 72. It will be understood by those skilled in the art that FIG. 7 is only an example of the terminal device 7, and does not constitute a limitation of the terminal device 7, which may comprise more or less components than those illustrated, or combine some components or different components. For example, the terminal device may further comprise a transmission output device, a network access device, a bus, and the like.

The processor 71 may be a central processing unit (CPU), or may be other universal processor, a digital signal processor (DSP), an application specific integrated circuit (ASIC), a Field-Programmable Gate Array (FPGA) or other programmable logic device, discrete gate or transistor logic device, discrete hardware components, etc. The universal processor may be microprocessor or said processor may also be any regular processor or the like.

The memory 72 may be an internal storage unit of the terminal device 7, such as a hard disk or an internal storage of the terminal device 7. The memory 72 may also be an external storage device of the terminal device 7, for example, the plug-in hard disk, a smart media card (SMC), a secure digital (SD) card, a flash card, and the like provided on the terminal device 7. Further, the memory 72 may also comprise both the internal storage unit and the external storage device of the terminal device 7. The memory 72 is used for storing the computer programs and programs and data required by the terminal device. The memory 72 may further be used for temporarily storing the data already output or to be output.

It will be apparent to those skilled in the art that, for convenience and brevity of description, only the division of each of the functional units and modules described above is exemplified. In practical applications, the above functions may be assigned to different functional units, modules according to needs, i.e., the internal structure of the device is divided into different functional units or modules to perform all or part of the functions described above. Various functional units and modules in the embodiments may be integrated into one processing unit, or each unit may exist physically separately, or two or more units may be integrated into one unit, and the integrated units may be implemented by hardware, or may also be implemented in the form of software functional units. In addition, the specific names of the various functional units and modules are only for the purpose of facilitating mutual differentiation, and are not intended to limit the protection scope of the present application. The specific working processes of the units and the modules in the above system, may refer to the corresponding processes in the above embodiments of method, the details of which are not described herein again.

In the above embodiments, the descriptions of the various embodiments are different focused, and the parts that are not detailed or described in a certain embodiment can be referred to the related descriptions of other embodiments.

Those skilled in the art will appreciate that the units and algorithm steps of the various examples described in connection with the embodiments disclosed herein may be implemented in electronic hardware or a combination of computer software and electronic hardware. Whether these functions are performed in a form of hardware or software depends on the specific application and design constraints of the technical solution. Those skilled in the art can use different methods for implementing the described functions for each particular application, but such implementation should not be considered to be beyond the scope of the present invention.

In the embodiments provided by the present invention, it should be understood that the disclosed apparatus/terminal device and method may be implemented in other manners. For example, the embodiments of apparatus/terminal device described above are merely illustrative. For example, the division of the modules or units is only a logical function division, and there may be other division manners in actual implementation. For example, multiple units or components may be combined or integrated into another system, or some features may be omitted or not implemented. In addition, the mutual coupling or direct coupling or communication connection shown or discussed may be an indirect coupling or communication connection through some interface, device or unit, and may be electrical, mechanical or otherwise.

The units described as separate components may or may not be physically separated, and the components displayed as units may or may not be physical units, i.e., it may be located in one place, or may be distributed to multiple network units. Some or all of the units may be selected according to actual needs to achieve the purpose of the solutions of the embodiments.

In addition, various functional units in the embodiments of the present invention may be integrated into one processing unit, or each unit may exist physically separately, or two or more units may be integrated into one unit, and the integrated units may be implemented by hardware, or may also be implemented in the form of software functional units.

The integrated modules/units may be stored in a computer readable storage medium if implemented in the form of software functional units and sold or used as separate products. Based on such understanding, the present invention may implement all or part of the processes of the foregoing embodiments through related hardware instructed by computer programs. The computer programs may be stored in a computer readable storage medium, and when executed by the processor, the computer programs may implement the steps of the various method embodiments described above. Wherein, the computer programs comprise computer program code, which may be in the form of source code, object code, executable file or some intermediate form and the like. The computer readable medium may include: any entity or device capable of carrying the computer program code, a recording medium, a USB flash drive, a removable hard disk, a magnetic disk, an optical disk, a computer memory, a read-only memory (ROM), a random access memory (RAM), electrical carrier signals, telecommunications signals, and software distribution media and the like. It should be noted that the content contained in the computer readable medium may be appropriately increased or decreased according to the requirements of legislation and patent practice in a jurisdiction, for example, in some jurisdictions, according to legislation and patent practice, the computer readable media does not include electrical carrier signals and telecommunication signals.

The embodiments described above are merely for illustrating the technical solutions of the present invention, and are not intended to limit; although the present invention has been described in detail with reference to the foregoing embodiments, those skilled in the art will understand that: the technical solutions described in above embodiments may still be modified, or some of the technical features may be equivalently replaced; and these modifications or substitutions, not deviating the corresponding technical solutions from the spirit and scope of the technical solutions of the embodiments of the present invention, should be included within the protection scope of the present invention.

What is claimed is:

1. A method comprising:
   loading, by a user of a terminal, a programming driver to the terminal;
   receiving, by a server, programming instructions from the terminal, wherein the programming instructions comprise programming file identification information;
   receiving, by an administrator, a customized information from the terminal based on a target programming file not being obtained by the server from a programming file database according to the programming file identification information;
   receiving, by the server, a customized programming file from the administrator, wherein the customized programming file is based on the customized information;
   sending, by the server, the customized programming file to the program editor via the programming driver based on the server receiving application instructions from the terminal;
   programming, by the program editor, a device according to the customized programming file; and
   executing, by the program editor, a programming operation for the device based on the customized programming file.

2. The method of claim 1, wherein the method further comprises:
   loading, by the user, an interface on the terminal for editing the programming instructions when the programming driver detects that the server receives information indicating that the program editor is successfully connected to the terminal and the device is successfully connected to the program editor;
   wherein the step of receiving the programming instructions by the server from the terminal comprises receiving the programming instructions input by the user at the interface; and
   wherein the method further comprises:
      receiving, by the server, a reset instruction from the terminal; and
      resetting the interface by the user according to the reset instruction.

3. The method of claim 1, wherein the step of receiving the programming instructions by the server from the terminal comprises:
   receiving, by the server, information of the device sent by the programming driver;
   loading, on the terminal, a list for selecting a programming file according to the information of the device; and
   receiving, by the server, the programming instructions from the user terminal according to the list for selecting the programming file.

4. The method of claim 1, wherein the method further comprises:
   sending the target programming file to the programming driver from the server based on the target programming file being obtained by the server from the programming file database according to the programming file identification, wherein target programming file is an encrypted programming file;
   decrypting, by the programming driver, the encrypted target programming file; and
   sending the decrypted target programming file to the program editor via the programming driver.

5. The method of claim 1, wherein the method further comprises:
   obtaining, by the program editor, programming status information of the device; and
   sending the programming status information to the terminal.

6. The method of claim 1, wherein before receiving the programming instructions by the server from the terminal, the method further comprises:
   receiving, by the server, an authorization request instruction sent from the terminal requesting an authorization of the customized programming file;
   sending, by the server, the authorization request instruction to the administrator; and
   granting, by the server, the user authorization corresponding to the authorization request instruction according to an approval instruction, when the approval instruction sent by the administrator is received by the server.

7. A non-transitory computer-readable storage medium comprising instructions that when executed by a processor cause the processor to perform the steps of:
   loading, by a user of a terminal, a programming driver to the terminal;
   receiving, by a server, programming instructions from the terminal, wherein the programming instructions comprise programming file identification information;
   receiving, by an administrator, a customized information from the terminal based on a target programming file not being obtained by the server from a programming file database according to the programming file identification information;
   receiving, by the server, a customized programming file from the administrator, wherein the customized programming file is based on the customized information;
   sending, by the server, the customized programming file to the program editor via the programming driver based on the server receiving application instructions from the terminal;
   programming, by the program editor, a device according to the customized programming file; and
   executing, by the program editor, a programming operation for the device based on the customized programming file.

8. A terminal comprising a memory, a processor, and computer programs stored in the memory and executable in the processor, wherein the processor, when executing the computer programs, is configured to implement the following steps of:
   loading, by a user of the terminal, a programming driver to the terminal;

receiving, by a server, programming instructions from the terminal, wherein the programming instructions comprise programming file identification information;

receiving, by an administrator, a customized information from the terminal based on a target programming file not being obtained by the server from a programming file database according to the programming file identification information;

receiving, by the server, a customized programming file from the administrator, wherein the customized programming file is based on the customized information;

sending, by the server, the customized programming file to the program editor via the programming driver based on the server receiving application instructions from the terminal;

programming, by the program editor, a device according to the customized programming file; and executing, by the program editor, a programming operation for the device based on the customized programming file.

9. The terminal of claim 8, wherein the processor, when executing the computer programs, is configured to further implement the following steps of:

loading, by the user, an interface on the terminal for editing the programming instructions when the programming driver detects that the server receives information indicating that the program editor is successfully connected to the terminal and the device is successfully connected to the program editor, wherein the step of receiving the programming instructions by the server from the terminal comprises receiving the programming instructions input by the user at the interface;

receiving, by the server, a reset instruction from the user terminal; and resetting the interface by the user according to the reset instruction.

10. The terminal device of claim 8, wherein the step of receiving the programming instructions from the terminal by the server comprises:

receiving, by the server, information of the device sent by the programming driver;

loading, on the terminal, a list for selecting a programming file according to the information of the device; and receiving, by the server, the programming instructions from the terminal according to the list for selecting the programming file.

11. The terminal of claim 8, wherein the processor, when executing the computer programs, is configured to further implement the following steps of:

sending the target programming file to the programming driver from the server based on the target programming file being obtained by the server from the programming file database according to the programming file identification, wherein target programming file is an encrypted programming file;

decrypting, by the programming driver, the encrypted target programming file; and sending the decrypted target programming file to the program editor via the programming driver.

12. The terminal device of claim 8, wherein the processor, when executing the computer programs, is configured to further implement the following steps of:

obtaining, by the program editor, programming status information of the device; and sending the programming status information to the terminal.

13. The terminal of claim 8, wherein before receiving the programming instructions by the server from the terminal, the processor, when executing the computer programs, is configured to further implement the following steps of:

receiving, by the server, an authorization request instruction from the terminal requesting an authorization of the customized programming file;

sending, by the server, the authorization request instruction to the administrator; and granting, by the server, the user authorization corresponding to the authorization request instruction according to an approval instruction, when the approval instruction sent by the administrator is received by the server.

* * * * *